(No Model.)

J. E. DAVIS.
COMBINED LOCK AND SUPPORT FOR BICYCLES.

No. 499,876. Patented June 20, 1893.

Witnesses:
J. Halpenny
Randall W. Burns

Inventor:
James Ellis Davis
By his attorneys
Gridley & Hopkins

UNITED STATES PATENT OFFICE.

JAMES ELLIS DAVIS, OF CHICAGO, ILLINOIS.

COMBINED LOCK AND SUPPORT FOR BICYCLES.

SPECIFICATION forming part of Letters Patent No. 499,876, dated June 20, 1893.

Application filed February 23, 1892. Renewed January 23, 1893. Serial No. 459,451. (No model.)

*To all whom it may concern:*

Be it known that I, JAMES ELLIS DAVIS, a citizen of the United States, residing at Chicago, in the county of Cook and State of Illinois, have invented a certain new and useful Combined Lock and Support for Bicycles, of which the following is a specification.

The present invention consists in certain features of novelty that are particularly pointed out in the claims hereinafter, and in order that it may be fully understood I will proceed to describe it with reference to the accompanying drawings, which are made a part of this specification and in which—

Figure 1:
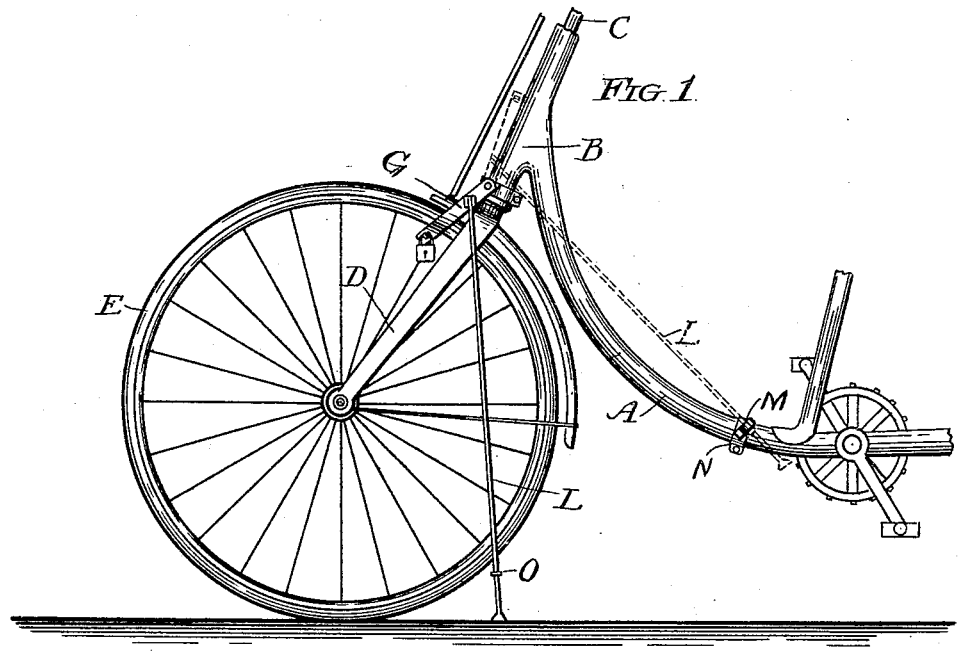
Figure 2:
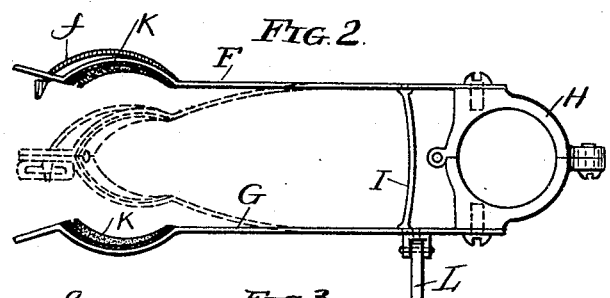
Figure 3:
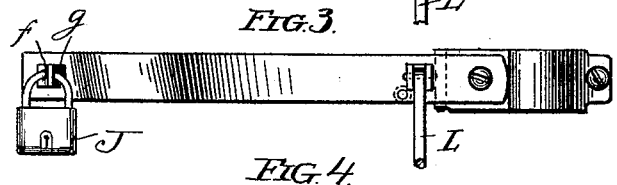
Figure 4:
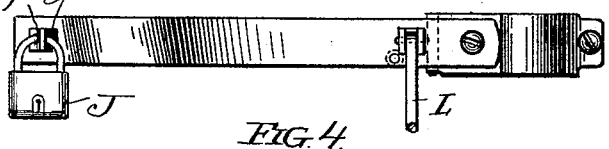
Figure 5:
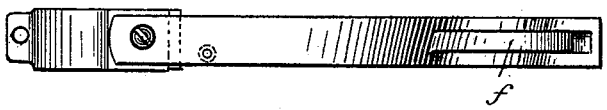

Figure 1 is a side elevation of the improved attachment and so much of a bicycle as is necessary in order to show its application thereto. Fig. 2 is a plan view of the improved attachment. Figs. 3 and 4 are elevations thereof viewed from opposite sides. Fig. 5 is a view of the clip for sustaining the prop when not in use, and of the collar for attaching it.

In the machine shown in the drawings the back-bone A is rigid with the tubular head B through which passes the steering-rod C that joins the fork D in which the front or steering wheel E is journaled. To the head B is attached the improved clamp which consists of two spring arms or jaws F and G, one of which has at or near its outer end a spring-hook *f* that is adapted to pass through an opening *g* formed through the other near its outer end, so that they may be hooked together as indicated by dotted lines in Fig. 2. These jaws are both pivoted to the head B either directly or through the medium of a two-part collar H which is in turn secured to said head by screws or other suitable means. They are also coupled together by a tie-rod I so that they move together about their pivots. They are provided near their outer ends with concavities of such shape that when in the positions shown by full lines in Fig. 1, and by dotted lines in Fig. 2, said concavities will receive the tire and rim of the wheel and the wheel will be prevented from revolving, so that the machine cannot be rolled either forward or backward. This done, to make it secure against being stolen it is only necessary to lock the jaws of the clamp together. This may be done by passing the hasp of a lock J through a hole in the hook *f*, provided for the purpose, and locking it. In order to prevent the jaws from marring the rim of the wheel, the concavities are lined with pads K of rubber or other suitable material.

When the machine is locked as above described it is not only prevented from rolling forward or backward, but in addition to this the steering-bar is prevented from turning in its socket, and hence the two wheels are held in the same plane. In order to accomplish this it is of course necessary that the clamp be secured to a part that does not turn with the steering-bar.

In the machine shown in the drawings the head B is suitable, but in many machines the back-bone is swiveled to the head and the head and steering-bar move together. In such case the clamp must be secured to the back-bone or some other part of the frame that does not turn with the fork. Modifying the attachment to thus meet the requirements of particular cases is a matter within the province of the skilled mechanic.

L is a rod or prop connected to the clamp in such a manner that it may have a practically universal movement, and of such length that its end may be brought in contact with the ground for supporting the machine in an upright position, as shown by Fig. 1. When not in use the clamp and the prop occupy the positions indicated by dotted lines in Fig. 1, the prop being held out of contact with the ground by a spring-clip M fixed to a band or collar N that is secured to the back-bone A or other suitable part of the frame. The prop has on it a shoulder O which is engaged by the clip M whereby the prop is prevented from moving endwise and the clamp is held out of operative position, as indicated by dotted lines in Fig. 1.

I do not confine myself to any particular means for securing the clamp to the frame, nor to the manner of constructing it, but I prefer to secure it as shown and to construct it with two jaws each formed of a single piece of plate steel forged to the proper shape. The spring hook *f* is preferably integral with the jaw F, being formed of a tongue punched out of the metal of which the jaw is formed, and bent to the proper shape.

I have shown my invention applied to a safety bicycle, but it is equally applicable to velocipedes of all kinds, requiring only such changes as are within the skill of a mechanic.

In order to hold the machine still more securely against forward and backward movement, each jaw of the clamp is provided with a half-round groove, which grooves, coming together, receive one of the spokes and thereby prevent even the slightest rotation of the wheel.

Having thus described my invention, the following is what I claim as new therein and desire to secure by Letters Patent:

1. The combination with a bicycle of a pair of spring-jaws F and G, adapted at their outer ends to engage the wheel a fixed part to which their inner ends are pivoted, and means for locking their outer ends together, each of said jaws being separate, and each formed of a single piece of spring metal, substantially as set forth.

2. The combination with a bicycle of a pair of spring jaws F and G adapted to engage the wheel having near their outer ends hook $f$ and opening $g$ respectively, and a fixed part to which the inner ends of said jaws are pivoted, each of said jaws being formed of a single piece of spring material, substantially as set forth.

3. The combination of the separate spring-jaws F and G, the collar H to which they are pivoted, a tie-rod connecting the jaws so that they move in unison, and means for securing the free ends of said jaws together to clamp the wheel of a velocipede, substantially as set forth.

4. The combination of the spring-jaws F and G having concavities near their outer ends, and having hook $f$ and opening $g$, respectively, the packing K in said cavities, the collar H to which the jaws are pivoted, the tie-rod I connecting the jaws together, a lock for locking them, a prop secured at one end to one of the jaws, and a clip for sustaining the free end of the prop when not in use, substantially as set forth.

JAMES ELLIS DAVIS.

Witnesses:
L. M. HOPKINS,
J. HALPENNY.